April 21, 1931.  A. R. BETHEL  1,802,072
GLASS FEEDER
Filed Sept. 22, 1927
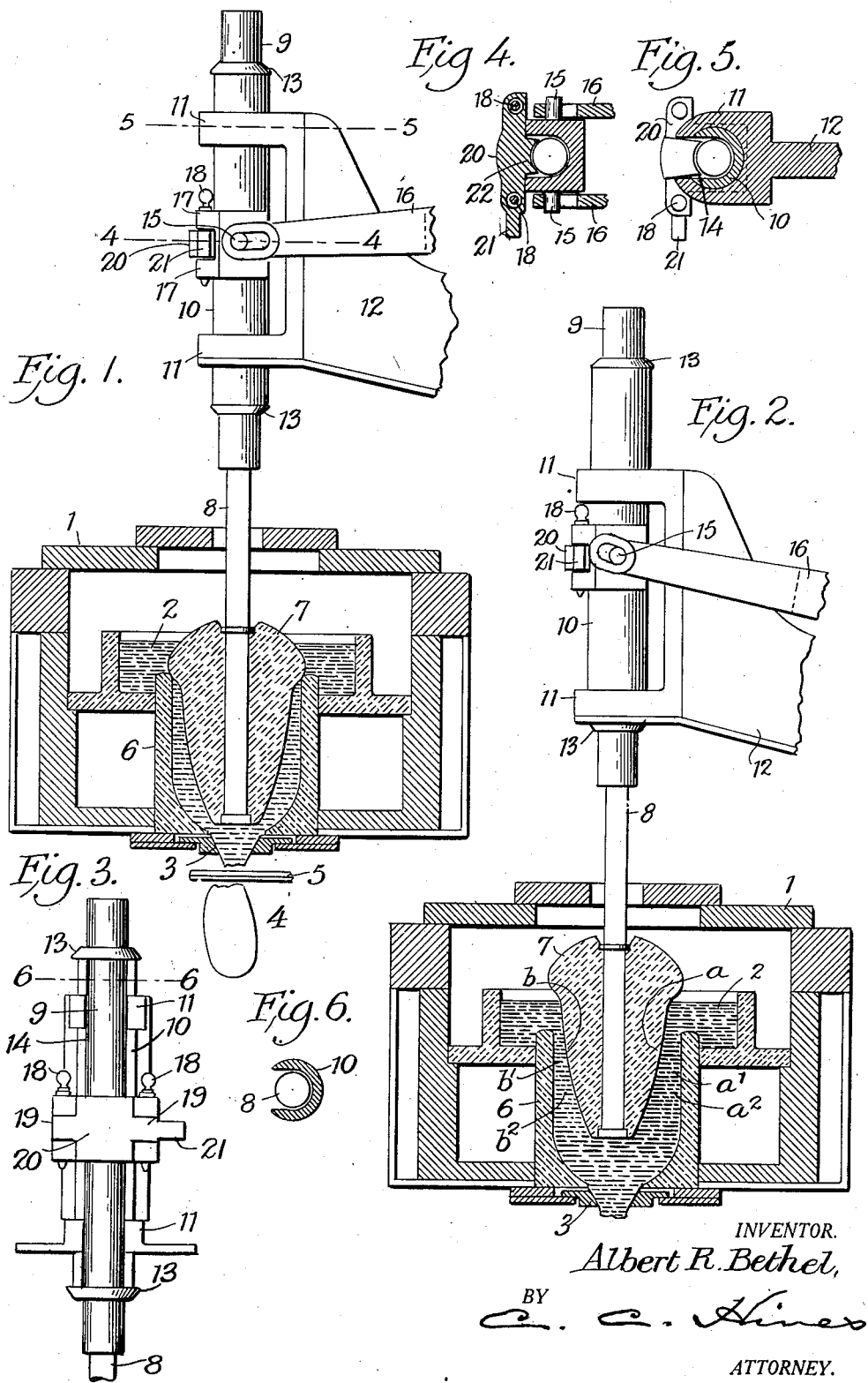
INVENTOR.
Albert R. Bethel,
BY
ATTORNEY.

Patented Apr. 21, 1931

1,802,072

UNITED STATES PATENT OFFICE

ALBERT R. BETHEL, OF HUNTINGTON PARK, CALIFORNIA

GLASS FEEDER

Application filed September 22, 1927. Serial No. 221,305.

This invention relates to glass feeders of that type in which molten glass flows from the reservoir of a discharge spout or chamber to and through a bushing or well extending upwardly into said chamber and finally outward through a discharge orifice communicating with the bottom of the well, and in which the feed of the glass through the well and to and through the orifice is controlled by a reciprocatory feed valve or plunger operated at predetermined time intervals.

The gobs or charges of glass supplied by feeders of this type are not of uniform temperature and consistency, but vary from time to time in temperature and consistency, the gobs having "hot and cold spots", or, in other words, being of less temperature at one side than at an opposite side thereof. Gobs so composed of glass of different temperatures tend to draw to one side and assume a shape not best adapted for molding action, and, because of such imperfect shape and variations in the consistency of the glass, result in the molding of faulty articles. This difficulty has been to a greater or less degree overcome by the use of burners to heat the glass as it flows from the spout body into the well, but with the objection of complicating the construction and operation of the feeder.
I have discovered that the formation of faulty gobs or drops is not entirely due to the flow of glass of different temperatures to the well, which is merely a contributory cause, but is largely due to faulty feed actions of the plunger as a result of the plunger becoming warped or otherwise getting out of center with respect to the well and out of proper alinement with the discharge orifice. In all feeders the head or lower flow-cut-off end of the plunger is at a considerable distance from its upper end fastened to its chuck or holder, and the upper part of the plunger which lies above the level of the glass is therefore at a much lower temperature than its head or flow-cut-off portion which is submerged in the hot glass. The consequence is, as I have found by observation and experiment, that warping of the plunger frequently occurs, so that the head or portion of the plunger moving in the well is shifted out of center with relation to the well and out of alinement with the discharge orifice. The effect of this is to cause an arbitrary constriction of one side of the channel between the plunger and well and widening of the diametrically opposite side of the channel without regard to glass conditions, the glass flowing through the constricted portion of the channel being checked in its flow and a portion of its heat absorbed by the plunger and well, while the glass flowing through the widened portion of the channel is permitted to flow freely and without any cooling effect such as would be caused by a reduction in its speed or flow and the absorption of heat therefrom. If, for example, the plunger is so out of alinement that it moves closer to the inner side of the well (that side nearer to the furnace end of the spout) than to the outer side of the well (that side most remote from the furnace end of the spout), and assuming that the glass flowing to the spout is of uniform temperature and consistency, that portion of the glass flowing along the wider portion of the channel will pass to the orifice substantially without change of temperature or consistency, while that portion of the glass flowing along the constricted portion of the channel will be checked in its flow and deprived of a portion of its heat through absorption by the plunger and walls of the channel. The result is the delivery of a drop having the defects noted. If the glass portions flowing to the well are of different temperatures, the following effects will occur. Where the portion of glass flowing through the constricted portion of the channel is cooler than that flowing through the wide portion of the channel, the difficulty will be aggravated by the further and objectionable cooling and increase in density of the first-named portion of glass with respect to the second-named portion of glass, so that a very defective gob or drop will be formed. On the other hand, if conditions should be the reverse, the feeder by chance will have a corrective action, in that the cooler and denser portion of glass will be permitted to flow freely without reduction of temperature and increase of density, while the hotter and more limpid portion of glass will be reduced in temperature and density and rendered more suitable for combination with the initially cooler portion of glass in order to produce a drop of more or less uniform temperature and consistency. Owing to the fact that these working actions are not visible to the workman or observer, the concerned working parts being concealed from view, the causes which I have mentioned leading to the production of defective gobs have not to my knowledge been heretofore perceived or understood, but have been attributed solely to lack of uniformity in the heating of the glass.

My invention is designed to provide a feeder which overcomes the objections mentioned and whereby drops or gobs of desirable shape and regular and uniform temperature and consistency may be delivered. To this end I mount the plunger loosely or in such manner that it may float or be moved from side to side or laterally of its plane of reciprocation under variations of pressure of the glass due to variations of temperature and density of the glass, so that the acting end of the plunger, whether or not the plunger is warped, will be responsive to conditions of the glass and will adjust itself to an accurately centered position if the discharging glass is of uniform temperature and consistency, or for a proper corrective action if the glass varies in temperature and consistency. By means of my improved feeder the necessity of using auxiliary heating burners is avoided, or if such burners are used, the efficiency of action of the feeder will be still further promoted and increased.

My invention also provides a novel method of controlling the discharge of glass for delivery of gobs or drops of predetermined fine shape and quality at all times.

The invention consists of the features of construction, combination and arrangement of parts, hereinafter fully described and claimed, reference being had to the accompanying drawing in which:—

Figure 1 is a vertical transverse section through a glass discharge spout or chamber showing in connection therewith a feed device constructed in accordance with my invention, the valve appearing in cut-off position.

Figure 2 is a similar view showing the valve open for a feed action and shifted laterally of its normal line of movement for a corrective action on the outflowing glass.

Figure 3 is an end elevation of the guide bracket and the parts of the feed device mounted therein.

Figures 4 and 5 are sections on the lines 4—4 and 5—5 of Figure 1.

Figure 6 is a section on the line 6—6 of Figure 8.

Referring now more particularly to the drawing. 1 designates a discharge spout or chamber which may be of any suitable form and construction and which in practice is suitably supplied with molten glass 2 from a furnace. This spout or chamber, as shown, is provided in its bottom with a discharge orifice 3 for the issuance of the glass at predetermined intervals to form a gob, drop or charge 4 to be supplied to a mold, and which is separated from the main body of glass by shears or other severing means conventionally illustrated at 5. The glass flows from the spout body to the orifice through a discharge cup, bushing or well 6 which is in open communication at its top with the body of the spout and at its bottom with the orifice. This well may be of any usual or suitable form, and receives the valve or plunger 7 which is periodically reciprocated in a vertical plane to govern the amount of glass discharged on each feed action. In the present instance the plunger shown is of valve type, that is to say, is so formed as to engage the rim of the well as a seat to positively cut off the flow of glass at the limit of its downward movement. I do not, however, limit the invention in use to this type of plunger, as other types of plungers well known in the art may be employed. The terms "plunger" and "valve" are, therefore, to be broadly regarded as synonymous and equivalents in this specification and the appended claims.

The plunger 7 is mounted on the lower end of a lower stem section 8 suitably connected at its upper end to the lower end of an upper stem section 9 fitted within and extending through a bushing sleeve 10. This sleeve 10 is fitted to reciprocate vertically in slotted guide members 11 on a fixed frame arm or bracket 12 and lies between and is engaged at its upper and lower ends by stop flanges 13 on the stem section 9, whereby the plunger and sleeve are properly coupled to reciprocate together. The slots in the guide members 11 are open at their outer ends to permit the sleeve and associated parts of the plunger to be slipped into and out of engagement therewith, and the sleeve is open or provided in its outer side with a longitudinal slot 14 of a size to permit the stem section 9 to be slipped laterally into and out of engagement therewith. This construction adapts the parts of the plunger to be readily and conveniently assembled and disassembled and applied to and removed from the guide bracket so that assemblage and disassemblage, as well as repairs or renewal of parts may be easily and conveniently effected.

The sleeve 10 is provided with pivot pins or trunnions 15 which engage bearing eyes on the fork arms of a vibrating motion transmitting lever 16, which is operated in practice by any suitable type of mechanism for periodically reciprocating the plunger. The sleeve is also provided on opposite sides of its slot with sets of hinge knuckles 17 receiving pins 18 which also project through knuckles or projections 19 on a latch or retaining member 20 having an operating finger piece 21. This latch or retaining member is provided with a projection 22 which engages the outer side of the stem section 9 and is curved on the same arc as the inner surface of the wall of the sleeve 10, so as to hold said stem section normally within the sleeve and against outward displacement through the slot thereof. One of the pins 18 serves as a pivot member on which the latch 20 may swing and the other as a fastening pin for holding the latch in closed position, upon removal of which fastening pin the latch may be swung by means of the finger piece 21 into open or closed positions. The diameter of the stem section 9 is such that it lies in slightly spaced relationship to the wall surfaces of the sleeve, slot and the projection 22, so that the plunger stem is fitted loosely in its sleeve holder or support. This loose mounting of the plunger within its holder allows it to swing or tilt universally to a certain degree, whereby the plunger or valve 7 is adapted to float or to be moved laterally in any direction to its normal line of reciprocation within the well 6 under varying pressures of the discharging glass during the discharge action.

The operation of the device is as follows:
Normally, that is, when the valve or plunger 7 is open for a discharge action, and the discharging glass flowing around the plunger and into the cup 6 is of uniform temperature and consistency, the plunger moves in a straight path and in axial alinement with the discharge orifice 3. During the outflow of the glass, therefore, the surfaces of the plunger head are disposed equidistantly at all points from the wall surfaces of the well, and all portions of the discharging glass are subjected to the same outflow resistance and any loss of heat therefrom through absorption by the walls of the well and plunger will be equalized. The glass thus discharging will accordingly be in proper condition for the production of a gob or charge which is of substantially uniform temperature and consistency and without cold and hot spots. If, however, glass flowing through the well varies in temperature and consistency on opposite sides of the plunger and between the same and the well, a corrective motion of the plunger will take place, as a result of the glass of lesser temperature and consistency exerting a preponderating degree of pressure to push the plunger laterally toward the portion of glass of higher temperature and greater limpidity or less consistency. As a result, the plunger will be so displaced laterally out of axial alinement with the discharge orifice that the channel formed beween the plunger and that side of the well between which the cooler and heavier glass is flowing will be increased in width with respect to the channel between the diametrically opposite sides of the plunger and well through which the glass of higher temperature and less consistency is flowing. The cooler and heavier portion of glass may, therefore, flow with abnormal rapidity towards the discharge orifice, with the result that the amount of heat abstracted from it by the walls of the plunger and well will be reduced, while, on the contrary, the reduction of the channel for the flow of the hotter and more limpid glass will check the speed of flow of this glass, or such glass will flow toward the discharge outlet at a subnormal rate of speed, whereby an abnormal amount of heat will be abstracted therefrom by the walls of the well and plunger. The two portions or streams of glass thus flowing toward the discharge orifice and meeting below the plunger will thereby be so governed, with respect to flow rate and temperature change, that, at the moment of meeting, a glass mixture of substantially uniform temperature and consistency will be produced, suitable for discharge through the orifice to form a gob of required temperature, consistency and shape assuming capacity for supply to the mold. A corrective movement of the plunger of the character just described is illustrated in Figure 2 which shows the plunger 7 as having been moved slightly to the left of its normal line of feed by the pressure of the glass flowing between its sides $a$ and the side $a'$ of the well 6, and thus providing an intervening channel $a^2$ of abnormal width, while through such motion of the plunger the side $b$ thereof is brought closer to the side $b'$ of the well and thus providing a relatively constricted channel $b^2$ for the flow of the hotter and more limpid glass. The relatively cool and heavier glass flowing through the channel $a^2$, therefore, is allowed to have a comparatively rapid rate of flow toward the orifice 3, while the hotter glass flowing through the channel $b^2$ is checked in its flow, with the results above stated. As the plunger may swing universally for corrective actions as required with relation to the opposed surfaces of the wall of the well 6, it will be evident that any relative variations in the temperature and consistency of the portions of glass flowing between any portions of the circumference of the plunger and opposed portions of the wall of the well will result in the required corrective action being produced. While a universal corrective movement of the plunger is preferred in order that all possible conditions in service may be met, it may only be necessary to mount the plunger so that it will have lateral movement in only two directions, that is, on opposite sides of its normal line of movement in one general direction, that is, from north to south or from east to west, etc., according to the geographical arrangement of the apparatus within a glass making establishment.

Extensive experiments have demonstrated that by providing a floating type of plunger of the character described, which is movable laterally of the line of feed of the glass for corrective actions, as set forth, gobs or charges of glass free from cold and hot spots and other defects, and suitable for the molding of first grade articles, may be produced with great regularity and uniformity without the necessity of using auxiliary means for internally heating the discharge spout and the glass therein. Such heating means, may, however, be used in connection with the flow plunger, with the result of still further increasing the efficiency of the feed mechanism.

Having thus fully described my invention, I claim:—

1. The method of controlling the feed of glass of different temperatures flowing from a source of supply for discharge through an outlet under control of a periodically operated control device, which consists in causing said control device to retard the rate of flow of the hotter glass with respect to that of the cooler glass.

2. The method of controlling the flow of streams of glass of different temperatures through the outlet of a receptacle from which the amount of flow of glass during any given period is governed by a reciprocatory feed member, which consists in causing said member to differentially vary the rate of flow of streams of glass of different temperatures so as to bring said streams substantially to a condition of equal temperature, and then mingling the streams for discharge through the outlet.

3. The method of governing the feed of glass for supplying charges of substantially uniform temperature and consistency from a receptacle having a discharge orifice and a flow channel leading thereto by means of a reciprocating plunger having a working motion toward and from the orifice and normally in axial alinement therewith, which consists in causing the plunger to move laterally out of its normal working line so as to relatively widen and constrict portions of the flow passage for relatively increasing and decreasing the speed of flow of portions of glass of relatively high and low degrees of temperature and consistency, and mingling such portions of glass for discharge in mingled condition through the discharge orifice.

4. In a glass feeder, a glass container having a discharge outlet and an annular channel for the flow of a column of glass thereto, and periodically operative means including an element surrounded by the glass in the channel for controlling the volumetric flow of glass through the channel and outlet, said element being freely responsive universally to lateral pressures thereon due to variations of temperature and consistency of portions of glass flowing between the same and the walls of the channel for varying its positions relative to said walls for reducing the rate of flow of a hotter portion of the glass with respect to that of a colder portion of the glass.

5. In a glass feeder, a glass container having a glass reservoir chamber, a discharge outlet and an annular channel for the flow of a column of glass from said chamber to said outlet, and a periodically operated control member movable in said channel and surrounded by the glass therein, for controlling the volumetric flow of glass therethrough and to the outlet, said member being pivotally suspended for free universal lateral movements under pressure changes thereon due to variations in the temperature and consistency of portions of the glass of the column for lateral adjustment relative to the walls of the channel for cooperation therewith to vary the effective area of portions of the channel whereby to decrease the rate of flow of a hotter portion of the glass with respect to that of a colder portion thereof.

6. In a glass feeder, a receptacle having a glass storage chamber, an outlet, and a well leading from the storage chamber to the outlet, a reciprocatory plunger controlling the flow of glass through the well and to the outlet, and means pivotally supporting said plunger for universal swinging movement in the well laterally of its normal line of reciprocatory movement.

7. In a glass feeder, a receptacle having a glass storage chamber, an outlet, and a well leading from the storage chamber to the outlet, a reciprocatory plunger controlling the flow of glass through the well and to the outlet, and means loosely suspending said plunger for universal movement in the well laterally of its normal line of reciprocatory movement.

8. In a glass feeder, a receptacle having a glass storage chamber, an outlet, a well leading from the storage chamber to the outlet, a reciprocatory plunger controlling the flow of glass through the well and to the outlet, and means tiltably supporting said plunger for universal movement in the well laterally of its normal line of reciprocatory movement.

9. In a glass feeder, a receptacle having a glass storage chamber, an outlet, and a well leading from the storage chamber to the outlet, and a reciprocatory plunger controlling the flow of glass through the well to the outlet and pivotally suspended so as to be universally movable in the well under variations of glass pressures laterally of its line of reciprocating movement.

10. In a glass feeder, a receptacle having an outlet, a well leading therefrom to the outlet, a vibratory member, a holder carried by said vibratory member, and a plunger reciprocated by said vibratory member in the well toward and from the outlet, said plunger being pivotally supported by the holder for universal movement in the well under variations of glass pressures laterally of its line of reciprocating movement.

11. In a glass feeder, a receptacle having a glass storage chamber, an outlet and a well leading from the storage chamber to the outlet, a vibratory member, and a plunger reciprocated by said vibratory member in the well toward and from the outlet, said plunger being so coupled to the vibratory member as to be free for universal movement in the well under variations of glass pressures laterally of its line of reciprocating movement.

12. In a glass feeder, a receptacle having a glass storage chamber, an outlet, a well leading from the glass storage chamber to the outlet, a vibratory member, a holder carried thereby, and a plunger reciprocated by said vibratory member toward and from the outlet, said plunger being tiltably supported by the holder for universal movement in the well under variations of glass pressures laterally of its line of reciprocating movement.

13. In a glass feeder, a glass containing chamber having an outlet, a glass conducting channel leading from the chamber to the outlet, and a plunger reciprocable in said channel toward and from the outlet and free to universally float laterally in the glass in said channel flowing toward said outlet.

14. In a glass feeder, a receptacle having an outlet, a well leading to the outlet, and a plunger reciprocable in the well toward and from the outlet and universally movable laterally therein under glass streams of different pressures flowing therethrough.

15. In a glass feeder, a receptacle having an outlet, a well leading to the outlet, and a plunger reciprocable in the well toward and from the outlet and supported for universal motion laterally of the well under variations of pressure of portions of glass flowing through the well.

16. The combination with a glass container having a discharge outlet and a glass conducting channel leading thereto, of a feeder periodically movable longitudinally in said channel toward and from said outlet for controlling the flow of glass therethrough, said feeder being universally movable laterally in the channel under variations of pressure of portions of the outflowing glass so as to retard the rate of flow of hotter portions of the glass with respect to that of colder portions of the glass before their admixture and discharge through the outlet.

In testimony whereof I affix my signature.

ALBERT R. BETHEL.